US012686318B2

(12) United States Patent (10) Patent No.: US 12,686,318 B2
Delanghe et al. (45) Date of Patent: Jul. 21, 2026

(54) SELF-ADJUSTING WHEEL TIE DOWN

(71) Applicant: Caliber, Inc., Burnsville, MN (US)

(72) Inventors: Ernest J. Delanghe, Burnsville, MN
(US); Kasey L. Pipo, Burnsville, MN
(US); William Butterfield, Burnsville,
MN (US); Jon Leikvold, Burnsville,
MN (US); Steven Potter, Burnsville,
MN (US); Anthony Delanghe,
Burnsville, MN (US)

(73) Assignee: Caliber, Inc., Burnsville, MN (US)

( * ) Notice: Subject to any disclaimer, the term of this
patent is extended or adjusted under 35
U.S.C. 154(b) by 349 days.

(21) Appl. No.: 18/581,012

(22) Filed: Feb. 19, 2024

(65) Prior Publication Data

US 2024/0375573 A1 Nov. 14, 2024

Related U.S. Application Data

(60) Provisional application No. 63/485,820, filed on Feb.
17, 2023.

(51) Int. Cl.
*B60P 3/075* (2006.01)
(52) U.S. Cl.
CPC ................................... *B60P 3/075* (2013.01)
(58) Field of Classification Search
CPC ............ B60P 3/075; B60P 3/073; B60P 3/079
See application file for complete search history.

(56) References Cited

U.S. PATENT DOCUMENTS

| | | | | | |
|---|---|---|---|---|---|
| 2,038,014 | A | * | 4/1936 | Tobin | B60P 3/073 |
| | | | | | 410/16 |
| 4,611,961 | A | * | 9/1986 | Van Iperen | B60P 3/075 |
| | | | | | 294/157 |
| 4,786,223 | A | * | 11/1988 | Crissy | B60P 3/075 |
| | | | | | 410/20 |
| 4,960,353 | A | * | 10/1990 | Thorndyke | B61D 45/001 |
| | | | | | 410/20 |

(Continued)

FOREIGN PATENT DOCUMENTS

| | | | | | |
|---|---|---|---|---|---|
| DE | 202016103771 U1 | * | 10/2016 | | B60P 7/08 |
| DE | 202018103745 U1 | * | 7/2018 | | B60P 3/075 |

(Continued)

*Primary Examiner* — Faye M Fleming
(74) *Attorney, Agent, or Firm* — Whitestone Law, PLLC

(57) ABSTRACT

A self-adjusting tie down for securing a tire on a wheel to a
platform having first and second loops attached thereto
includes a first ring and a second ring spaced from the first
ring. A tread engaging strap is configured to engage the tread
surface of the tire, the tread strap being attached to the first
ring proximate a first end and positioned through the second
ring, where the tread engaging strap includes a length
adjusting mechanism attached to a second end and a first
securing mechanism configured to engage the first loop
attached to the platform. The tie down includes first and
second sidewall engaging straps configured to engage the
left and right sidewalls of the tire, each of the first and
second sidewall engaging straps attached to the second ring
proximate a first and positioned through the first ring, each
of the first and second sidewall engaging straps comprising
a second securing mechanism configured to engage the
second loop attached to the platform.

27 Claims, 12 Drawing Sheets

(56) References Cited

U.S. PATENT DOCUMENTS

| | | | | |
|---|---|---|---|---|
| 5,584,622 | A * | 12/1996 | Dickerson, Sr. | B60P 3/075 |
| | | | | 410/20 |
| 5,586,849 | A * | 12/1996 | Kissel | B60P 3/075 |
| | | | | 24/698.2 |
| 5,775,870 | A * | 7/1998 | Hogan | B66F 7/22 |
| | | | | 254/94 |
| 5,941,665 | A * | 8/1999 | Dahlin | B60P 3/075 |
| | | | | 410/20 |
| D494,919 | S * | 8/2004 | Davis | D12/223 |
| 7,025,545 | B1 * | 4/2006 | Robison | B60P 3/075 |
| | | | | 410/20 |
| 7,632,052 | B2 * | 12/2009 | Tatina | B60P 3/075 |
| | | | | 410/20 |
| 7,871,228 | B2 * | 1/2011 | Blanchet | B60P 3/079 |
| | | | | 410/23 |
| 8,439,610 | B2 * | 5/2013 | Mamie | B60P 7/0807 |
| | | | | 410/3 |
| 8,459,909 | B2 * | 6/2013 | Hutchinson | B60P 3/075 |
| | | | | 410/3 |
| 8,870,502 | B2 * | 10/2014 | Lugo | B60P 3/075 |
| | | | | 410/96 |
| 10,160,468 | B1 * | 12/2018 | Hurd | B62B 5/0093 |
| 10,518,689 | B1 * | 12/2019 | Andre | B60P 3/079 |
| 11,292,382 | B2 * | 4/2022 | Johnson | B60P 7/0807 |
| 2013/0216324 | A1 * | 8/2013 | Tatina | B60P 3/075 |
| | | | | 410/3 |
| 2019/0283654 | A1 * | 9/2019 | Oblizajek | B60P 7/083 |
| 2022/0041093 | A1 * | 2/2022 | Sauerwald | B60P 3/075 |

FOREIGN PATENT DOCUMENTS

| | | | | |
|---|---|---|---|---|
| JP | 2009202614 A * | 9/2009 | | |
| JP | 2010228582 A * | 10/2010 | | B60P 3/075 |
| WO | WO-2018045406 A1 * | 3/2018 | | B60P 3/075 |

* cited by examiner

SELF-ADJUSTING WHEEL TIE DOWN

BACKGROUND

The present disclosure relates to a wheel tie down configured to engage the tread and sidewalls of the tire to retain the tire to a platform of a transportation vehicle or accessory. More particularly, the present disclosure relates to a self-adjusting wheel tie down configured to engage and retain different sized tires to the platform of the transportation vehicle or accessory.

Many people enjoy operating all terrain vehicles (ATVs) and utility task vehicles (UTVs) over rough terrain and trails. However, the ATVs and UTVs typically have to be transported on the platform of the transportation vehicle or accessory to the site of the rough terrain and/or trails.

Further, many people transport automobiles, such as cars, sport utility vehicles and trucks, on platforms of transportation vehicles or accessories for a number of reasons. Some reasons for transporting automobiles on platforms of transportation vehicles or accessories include taking an automobile for repair and to minimize mileage on the automobile.

To safely transport ATVs, UTVs and automobiles on the platform of the transportation vehicle or accessory to the site, the tires are typically engaged with chocks and secured with a strap of a tie downs that attach to the platform at opposite sides of the tire along the tread. Only engaging the tread surface with the strap of the tie down can allow lateral or side to side movement of the tire, which can allow the tire to sufficiently move to disengage the tie down.

To prevent lateral movement, side straps of a fixed length are attached to the main strap of the tie down. The side straps engage the side walls of the tire to prevent lateral movement.

However, as the diameter and width of the tires vary with different styles and types of ATVs, UTVs and automobiles, there is no tic down that fits every tire without a significant amount of manipulation of the tie down strap lengths, if even possible. Alternatively, some wheel tie downs are incompatible with some tires due to the size and width of the tire relative to the size of the tie down.

As such, there is a need for an adjustable wheel tie down that engages the tread and sidewalls of different sized tires. There is also a need for a self-adjusting wheel tie down to accommodate and retain different sized tires without the need to manually manipulate the length of the straps of the tie down prior to engaging the tire.

SUMMARY

An aspect of the present disclosure relates to a self-adjusting tie down for securing a tire on a wheel to a platform having first and second loops attached thereto. The tie down includes a first ring and a second ring spaced from the first ring. A tread engaging strap is configured to engage the tread surface of the tire, the tread strap being attached to the first ring proximate a first end and positioned through the second ring, where the tread engaging strap includes a length adjusting mechanism attached to a second end and a first securing mechanism configured to engage the first loop attached to the platform. The tie down includes first and second sidewall engaging straps configured to engage the left and right sidewalls of the tire. Each of the first and second sidewall engaging straps are attached to the second ring proximate a first end and are positioned through the first ring. Each of the first and second sidewall engaging straps comprise a second securing mechanism proximate a second end, where the second securing mechanisms are configured to engage the second loop attached to the platform. When a wheel of a vehicle is positioned on the platform between the first and second loops, the tread engaging strap is positioned on the tread surface of the tire and the first and second sidewall engaging straps are positioned proximate the first and second sidewalls. The first securing mechanism engages the first loop and the second securing mechanisms are attached to the second loop. The length adjusting mechanism is then manipulated to shorten an effective length of the tread engaging strap which raises the first ring and causes a length of a path from the second loop to the first ring to increase and causes the first and second sidewall straps to engage the left and right sidewalls as the tread engaging strap engages the tread surface of the tire.

Another aspect of the present disclosure relates to a method of securing a tire to a platform having first and second loops attached thereto. The method includes providing a self-adjusting tie down where the tie down includes a first ring, a second ring spaced from the first ring and a tread engaging strap configured to engage a tread surface of the tire, the tread strap being attached to the first ring proximate a first end and positioned through the second ring. The tread engaging strap includes a length adjust mechanism and a first securing mechanism attached to the first end. The tie down includes first and second sidewall engaging straps configured to engage the left and right sidewalls of the tire, each of the first and second sidewall engaging straps attached to the second ring proximate a first and positioned through the first ring. Each of the first and second sidewall engaging straps include a second securing mechanism. The method includes positioning the tie down about the tire such that the tread engaging strap engages a tread surface of the tire and the first and second sidewall engaging straps are proximate left and right sidewalls of the tire. The method also includes securing the first securing mechanism of the tread engaging strap to the first loop attached to the platform, and securing each of the second securing mechanisms of the first and second sidewall engaging straps to the second loop attached to the platform. The method also includes manipulating the length adjusting mechanism such that an effective length of the tread engaging strap is shortened which raises the first ring and causes a length of a path from the second loop to the first ring to increase and causes the first and second sidewall straps to engage the left and right sidewalls as the tread engaging strap engages the tread surface of the tire.

Another aspect of the present disclosure relates to a self-adjusting tie down for securing a tire on a wheel of a vehicle to a platform having first and second loops attached thereto, where the tire has a tread surface and left and right sidewalls. The tie down includes a first ring and a second ring spaced from the first ring. A securing strap is attached to the first ring and having a first securing mechanism configured to engage the second loop. The self-adjusting tie down includes a tread engaging strap configured to engage the tread surface of the tire, the tread engaging strap engaging the first and second rings and first and second sidewall engaging straps configured to engage the left and right sidewalls of the tire, each of the first and second sidewall engaging straps attached to the first ring or the second ring. The tie down includes a length adjusting mechanism configured to be attached to the second loop with a second securing mechanism, the length adjusting mechanism configured to coil and uncoil the sidewall engaging strap. A wheel of a vehicle is positioned on the platform between the first and second loops, and the tread engaging strap is positioned on the tread surface of the tire and the first and second sidewall engaging straps are positioned proximate the first and second sidewall. The first securing mechanism then engages the first loop and the second securing mechanism is attached to the second loop. Then the length adjusting mechanism is manipulated to shorten an effective length of the first and second sidewall engaging straps which draws the second ring toward the length adjusting mechanism and raises the first ring and causes the first and second sidewall straps to engage the left and right sidewalls as the tread engaging strap engages the tread surface of the tire.

Another aspect of the present disclosure relates to a self-adjusting tie down for securing a tire on a wheel of a vehicle to a platform having first and second loops attached thereto, where the tire has a tread surface and left and right sidewalls. The tie down includes a first ring and a second ring spaced from the first ring. A securing strap is attached to the first ring and having a first securing mechanism configured to engage the second loop. The self-adjusting tie down includes a transverse tread engaging strap configured to engage the tread surface of the tire, the transverse tread engaging strap slidably engaging the first and second sidewall engaging straps. The first and second sidewall engaging straps are configured to engage the left and right sidewalls of the tire, each of the first and second sidewall engaging straps attached to the first ring or the second ring. The tie down includes a length adjusting mechanism configured to be attached to the second loop with a second securing mechanism, the length adjusting mechanism configured to coil and uncoil the sidewall engaging strap. A wheel of a vehicle is positioned on the platform between the first and second loops, and the transverse tread engaging strap is positioned on the tread surface of the tire and the first and second sidewall engaging straps are positioned proximate the first and second sidewall. The first securing mechanism then engages the first loop and the second securing mechanism is attached to the second loop. Then the length adjusting mechanism is manipulated to shorten an effective length of the first and second sidewall engaging straps which draws the second ring toward the length adjusting mechanism and raises the first ring and causes the first and second sidewall straps to engage the left and right sidewalls as the transverse tread engaging strap engages the tread surface of the tire.

DETAILED DESCRIPTION

Figure 1:
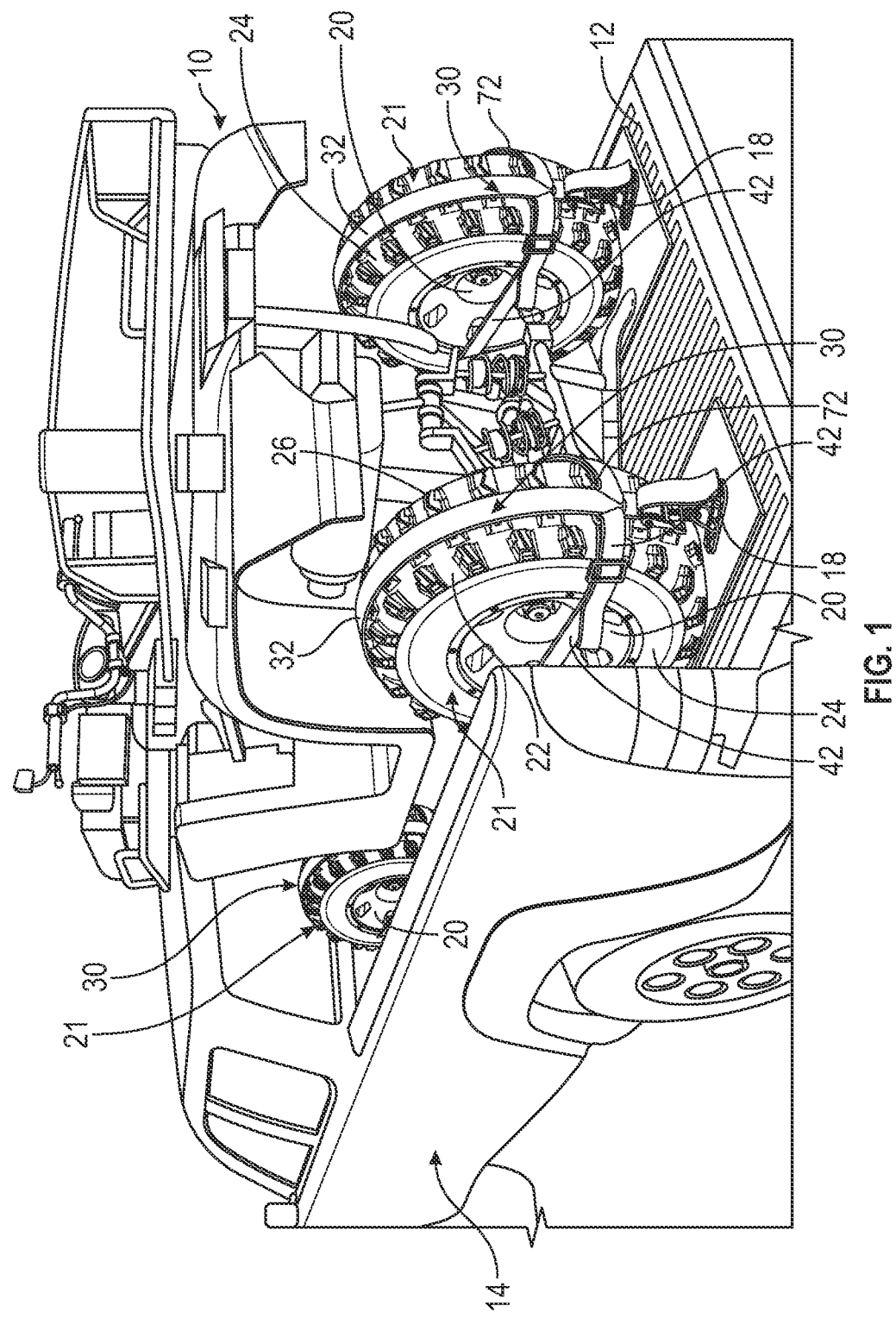
FIG. 1 is a view of a UTV secured to a platform of a transportation vehicle with an embodiment of self-adjusting tie downs.
Figure 2:
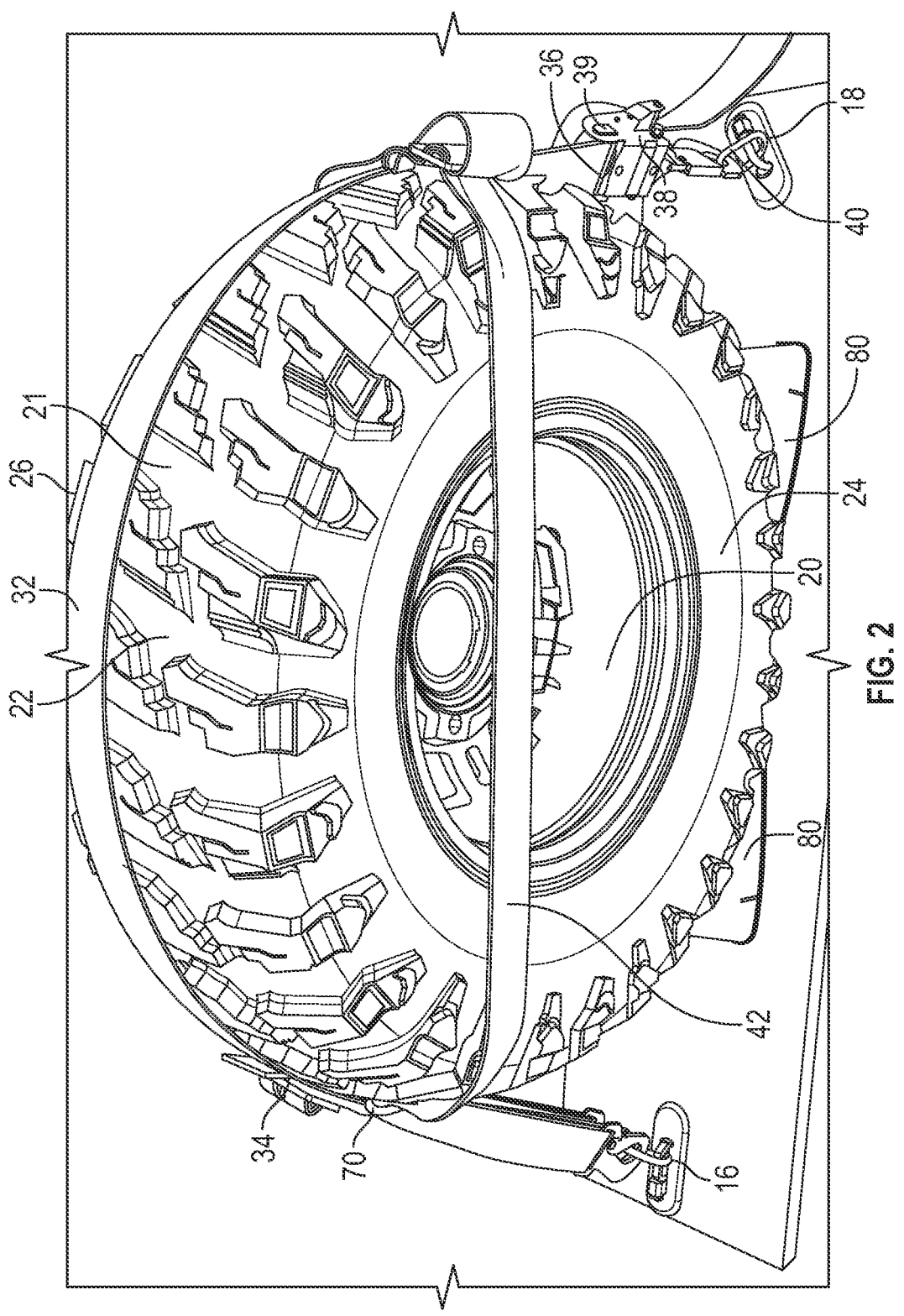
FIG. 2 is a top perspective view of a wheel secured with the self-adjusting tie down.
Figure 3:
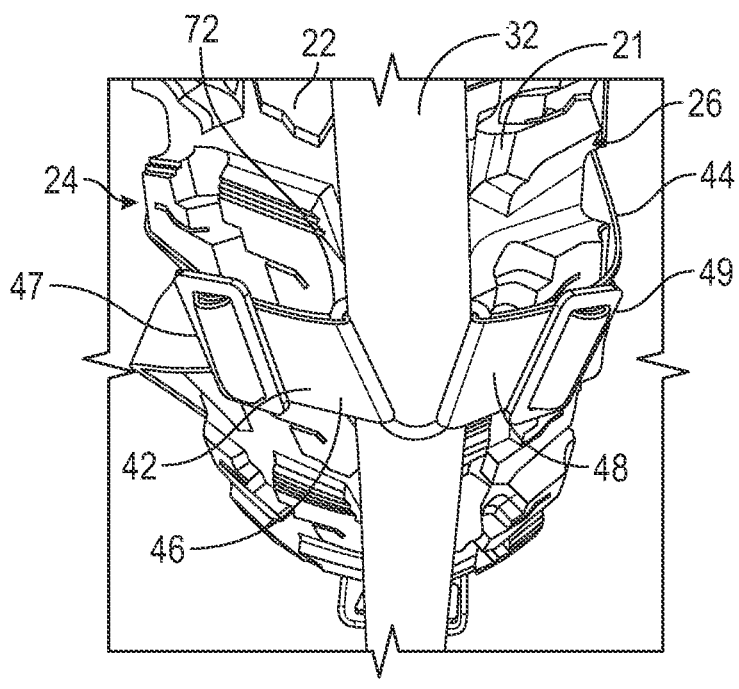
FIG. 3 is a front view of a wheel secured with the self-adjusting tic down.
Figure 4:
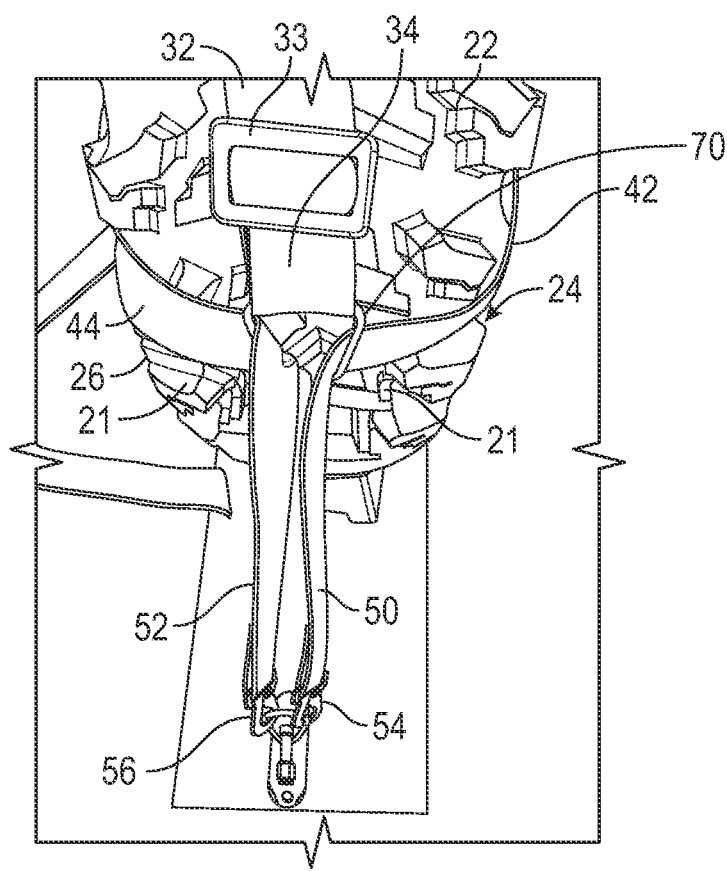
FIG. 4 is a back view of a wheel secured with the self-adjusting tic down.
Figure 5:
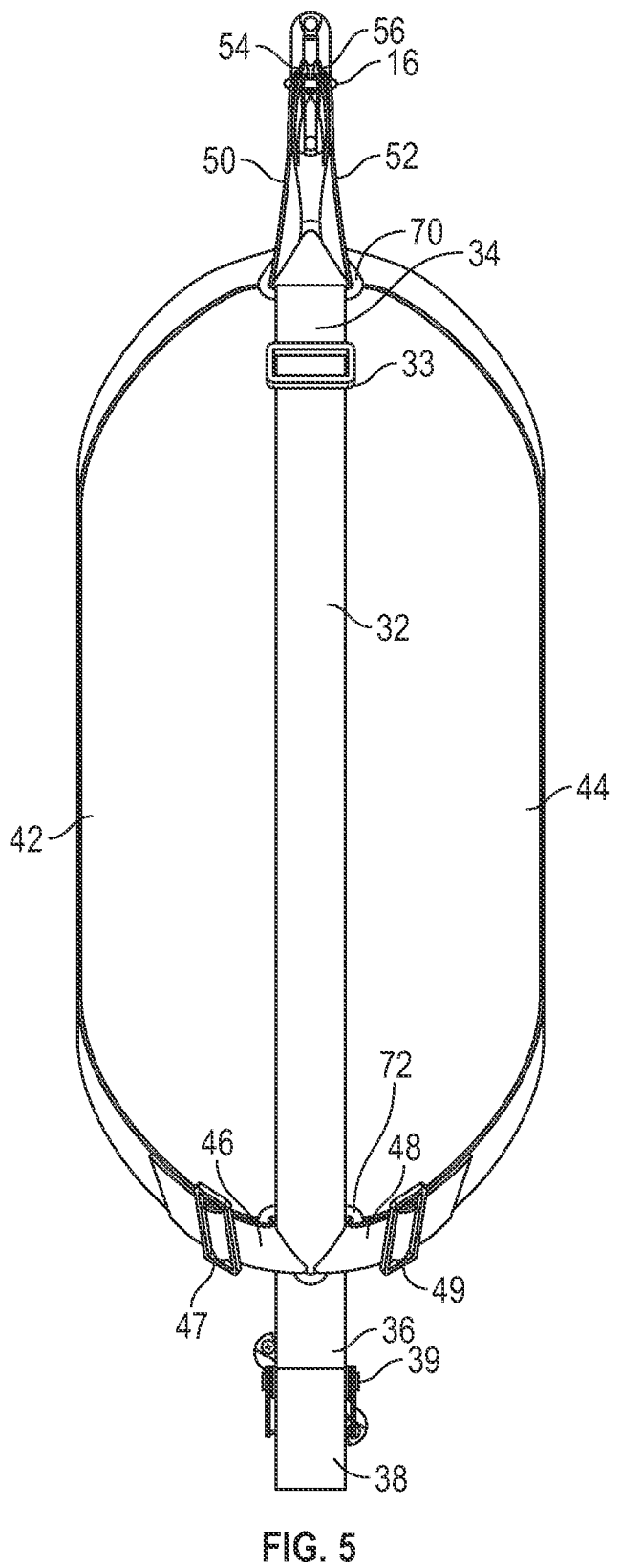
FIG. 5 is a view of the self-adjusting tie down.

A vehicle 10 secured to a platform 12 of a transportation vehicle or accessory 14 is illustrated in FIG. 1. Wheels 20 of the vehicle 10 are secured in place to the platform 12 with self-adjusting tie downs 30 where the self-adjusting tie downs accommodate different sized diameter and width tires 21 on the wheels 20 while engaging the tread surface and opposing sidewalls of the tires 21 to substantially prevent front and back movement and side to side movement of the vehicle 10 on the platform 12.

While the vehicle 10 as illustrated is a utility task vehicle (UTV), the present disclosure is not limited to using the tie downs 30 with a UTV 10. Rather, the tie down 30 can be used to secure the wheel of any vehicle including, but not limited to, all-terrain vehicles (ATVs), automobiles including, cars and sport utility vehicles (SUVs), pickup trucks, light duty trucks and heavy-duty trucks and motorcycles.

Referring to FIGS. 1-5, spaced apart front and back loops 16 and 18 are secured to the platform 12 at spaced apart locations that accommodate the largest of a typical vehicle tire 21. While a platform 12 on a transportation vehicle 14 is disclosed and illustrated, the present disclosure can also be used on a platform of any suitable vehicle or accessory, such as, but not limited to, a trailer. The spaced apart front and back loops 16 and 18 typically pivot to lie substantially flat on the platform 12 when not in use. When the tie downs 30 are in use, the force imparted on the front and back loops 16 and 18 by the tie downs 30 raise the loops 16 and 18 from the platform 12. In other embodiments, static front and back loops 16 and 18, respectively, can be utilized.

The self-adjusting tie downs 30 include a tread engaging strap 32 having one end 34 attached to a first D ring 70 where the tread engaging strap 32 pass through a second D ring 72 that is spaced from the first D ring 70. The end 34 is secured to the first D ring 70 with a sliding buckle 33. However, the end 34 can be secured to the first D ring 70 with any suitable attaching mechanism such as stitching or an adhesive. Another end 36 of the tread engaging strap 32 is secured to a ratchet buckle 38 where the ratchet buckle 38 is secured to the back loop 18 with a spring-loaded snap hook 40.

While a spring-loaded snap hook 40 is illustrated and described, other securing mechanisms for attaching an end of a strap to a loop are within the scope of the present disclosure including, but not limited to, a carabiner, a hook, a threaded quick link and the like. Additionally, while a ratchet buckle 38 is illustrated and described for tightening the tie down, other tightening mechanisms are within the scope of the present disclosure including, but not limited to, a cam strap, a buckle with a prong configured to engage holes in the strap, snaps, buttons and hook and loop securing mechanisms. While D rings 70 and 72 are disclosed and illustrated, any suitable securing mechanism is within the scope of the present disclosure, including but not limited to circular loops, sprint loaded rings, clevises or any other member that can secure an end of some straps while allowing other straps to pass through an opening.

The self-adjusting tie down 30 include a left sidewall engaging strap 42 and a right sidewall engaging strap 44, wherein the left and right sidewall engaging straps 42 and 44 are substantially mirror images of each other. Both the left and right sidewall engaging straps 42 and 44 have first ends 46 and 48 that are secured to the second D ring 72 with sliding buckles 47 and 49, respectively. However, other securing mechanisms besides sliding buckles can be utilized such as, but not limited to, pronged buckles configured to engages holes in the strap, cam buckles, snap buckles, roller buckles, stitching and an adhesive bond. The tread engaging strap 32 is positioned through the second D ring 72 between the ends 46 and 48 such that the tread engaging strap 32 moves through the second D ring 72 while the first ends 46 and 48 of the left and right sidewall engaging straps 42 and 44 are substantially fixed in place.

The left and right sidewall engaging straps 42 and 44 are positioned through the first D ring 70 and the end 34 of the tread engaging strap 32 is secured to the first D ring 70 between the left and right sidewall engaging straps 42 and 44. Spring loaded snap hooks 54 and 56 are secured to second ends 50 and 52 of the left and right sidewall engaging straps 42 and 44. The spring loaded snap hooks 54 and 56 are configured to engage the front loop 16. While spring-loaded snap hooks 54 and 56 are illustrated and described, other securing mechanisms are within the scope of the present disclosure including, but not limited to, a carabiner, a hook, a threaded quick link and the like.

With a wheel 20 of the vehicle 10 positioned between the front and back loops 16 and 18, the tread engaging strap 32 is loosely positioned over a tread surface 22 of the tire 21 and the left and right sidewall engaging straps 42 and 44 are loosely positioned adjacent left and right sidewalls 24 and 26 of the tire 21. The snap hooks 54 and 56 of the left and right sidewall engaging straps 42 and 44 are secured to the front loop 16 and the snap hook 40 of the tread engaging strap 32 attached to the back loop 18. However, the self-adjusting tie down could be positioned in the opposite direction where the snap hook 40 of the tread engaging strap 32 attached to the front loop 16 and the snap hooks 54 and 56 of the left and right sidewall engaging straps 42 and 44 are secured to the back loop 18 and perform the same function.

With the tie down 30 positioned about the wheel 20 and the snap hooks 54 and 56 attached to the front loop 16 and the snap hook 40 of the tread engaging strap 32 attached to the back loop 18, a user manipulates the ratchet buckle 38 to draw the tread engaging strap 32 onto a reel 39. As the tread engaging strap 32 is wound onto the reel 39, an effective length of the tread engaging strap 32 decreases which causes the second D-ring 72 to rise on the tread surface 22 of the tire 21. As the second D-ring 72 rises on the wheel, a length of a path between the back loop 18 and the first D-ring 70 through the second D-ring 72 increases, which causes the left and right sidewall straps 42 and 44 to constrict against the left and right sidewalls 24 and 26 of the tire 21.

The ratchet buckle 38 is continued to be manipulated until the tread engaging strap 32 and the left and right sidewall straps 42 and 44 are in tension and applying forces on the tread surface 22 and the left and right sidewalls 24 and 26, all respectively, of the tire 21. The tread engaging strap 32 applies a downward force on the tread surface 22 of the tire 21 while the left and right sidewall engaging straps 42 and 44 substantially equal and opposing lateral forces on the left and right sidewalls 24 and 26 of the tire 21. The downward force applied by the tread engaging strap 32 and the sub-stantially equal and opposing lateral forces applied by the sidewall engaging straps 42 and 44 on the tire 21 retains the tire 21 and the wheel 20 in a substantially fixed location on the platform 12 of the transportation vehicle or accessory 14 by preventing the wheel 20 from rolling or sliding sideways on the platform 12 of the transportation vehicle or accessory 14. Chocks 80 can be optionally wedged between the tire 21 and the platform 12 to provide additional forces to prevent the tire 21 from rolling on the platform 12.

The same process is used to secure a self-adjusting tie down 30 to each tire 21 on each wheel 20 of the vehicle 10 prior to transporting the vehicle 10. With the tires 21 of the vehicle 10 secured with the self-adjusting tie downs 30 and the optional chocks 80 in place, the vehicle 10 can be transported to a selected location.

In some embodiments the left and right sidewall straps 42 and 44 are a different color than the color of the tread engaging strap 32. The different colored straps aid the user to orientate the tread engaging strap 32 about the tread of the tire and the sidewall straps 42 and 44 about the side walls of the tire 21 prior to securing the tire 21 with the tie down 30.

To unload the vehicle 10, a pawl on the ratchet buckle 38 is released which allows the spool 39 to unwind the tread engaging strap 32 which in turn releases the force on the tread surface 22 of the tire 21. With the tension released on the tread engaging strap 32, the first D ring 70 can be manipulated downward toward the platform 12, which reduces the length of a path between the back loop 18 and the first D-ring 70 through the second D-ring 72 and causes the left and right sidewall engaging straps 42 and 44 to go slack. With the left and right sidewall engaging straps 42 and 44 and the tread engaging strap 32 slack, the snap hooks 54 and 56 of the left and right sidewall engaging straps 42 and 44 are removed from the front loop 16 and the snap hook 40 of the tread engaging strap 32 removed from the back loop 18 such that the tie down 30 can be removed from the tire 21. Once the chocks 80 are removed the vehicle 10 can be rolled off of the platform 12 of the transportation vehicle or accessory 14.

Figure 6:
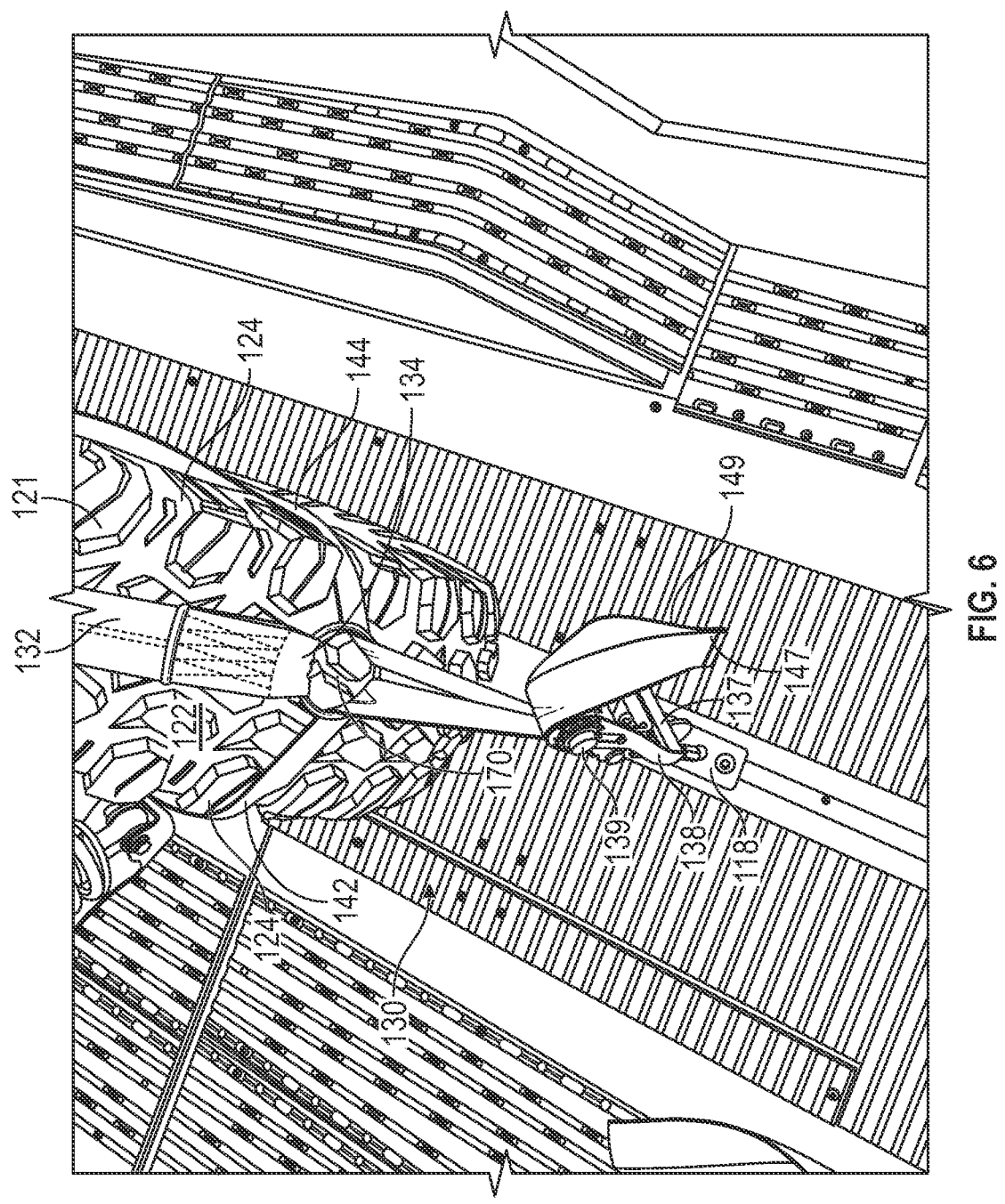
FIG. 6 is a partial view of a second embodiment of a self-adjusting tie down.
Figure 7:
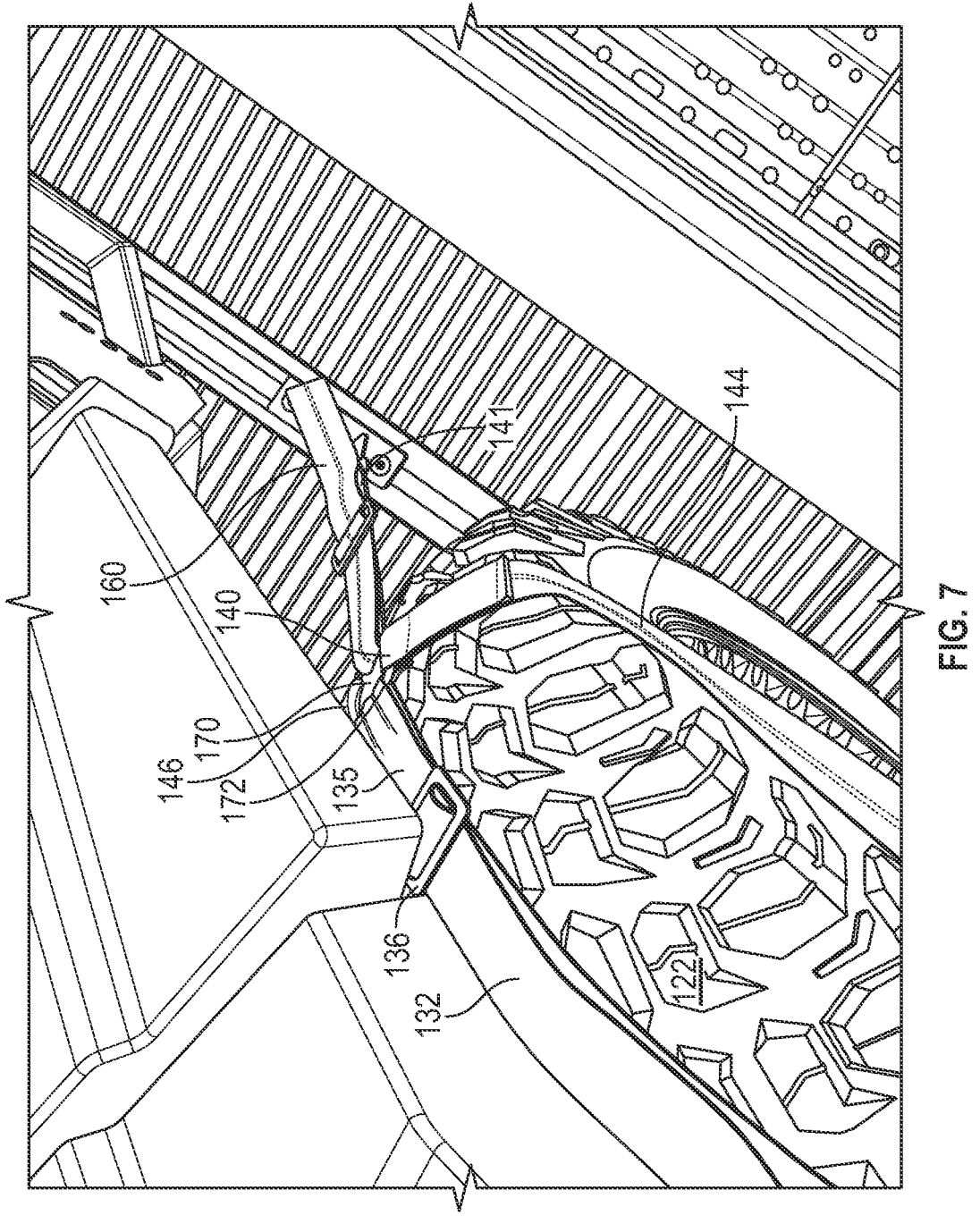
FIG. 7 is another partial view of the second embodiment of the self-adjusting tie down.
Figure 8:
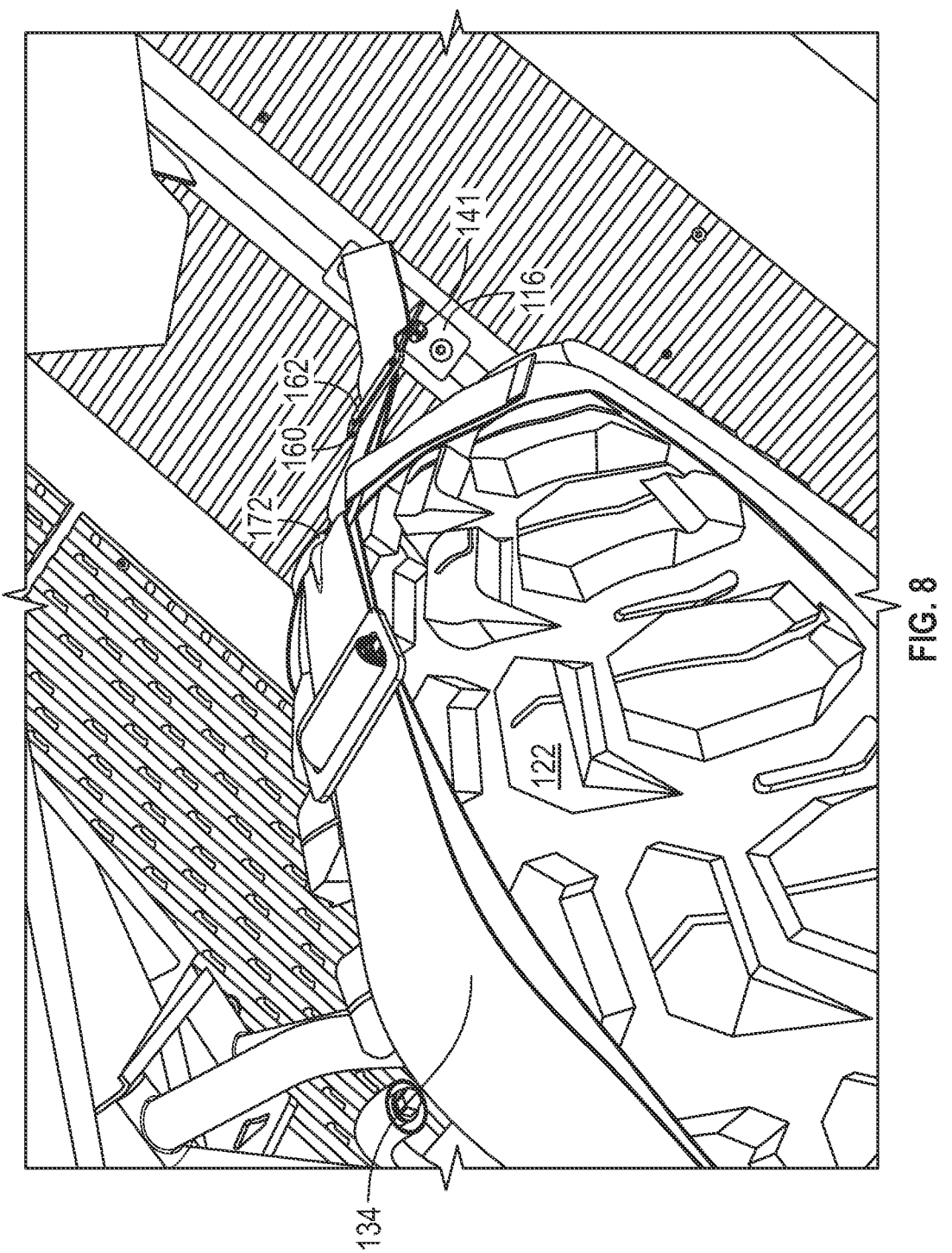
FIG. 8 is an enlarged view of FIG. 6.

Another embodiment of a self-adjusting tie down is illustrated at FIGS. 6-8 at 130. The self-adjusting tie down 130 includes left and right sidewall straps 142 and 144 that are similar to the left and right sidewall straps 42 and 44 in the embodiment 30. Both the left and right sidewall engaging straps 142 and 144 have first ends 146 and 148 that are secured to a second ring 172 with stitching. However, other securing mechanisms besides stitching can be utilized such as, but not limited to, sliding buckles, pronged buckles configured to engages holes in the strap, cam buckles, snap buckles, roller buckles, stitching and an adhesive bond.

Both the left and right sidewall engaging straps 142 and 144 are positioned through a first ring 170 that is spaced from the second ring 172. Second ends 147 and 149 are positioned through a reel 139 of a ratchet buckle 138, where the ratchet buckle 138 is attached to the back loop 118 with a snap hook 137.

The tread engaging strap 132 has one end 134 secured to the first ring 170 and another end 135 secured to the second ring 172 with a slide buckle 136 used to adjust an effective length of the tread engaging strap 132 between the first ring 170 and the second ring 172. A securing strap 160 is positioned through the second ring 172 where an end 162 is positioned through a slide buckle 164 configured to adjust a length of the securing strap 160. The securing strap 160 is secured to the front loop 116 with a snap hook 141.

With a wheel 120 of the vehicle 110 positioned between the front and back loops 116 and 118, the tread engaging strap 132 is loosely positioned over a tread surface 122 of the tire 121 and the left and right sidewall engaging straps 142 and 144 are loosely positioned adjacent left and right sidewalls 124 and 126 of the tire 121. The snap hook 137 attached to the ratchet buckle 138 is secured to the back loop 118 attached to the platform 112 and the snap hook 141 of the securing strap 32 attached to the front loop 116. However, the self-adjusting tie down could be positioned in the opposite direction where the snap hook 141 of the securing strap 160 attached to the back loop 118 and the snap hook 137 attaching the ratchet buckle 138 to the front loop 116 and perform the same function.

With the tie down 130 positioned about the wheel 20 and the snap hook 140 attached to the front loop 116 and the 137 attached to the back loop 118, a user optionally manipulates the slide buckle 164 is used to adjust an effective length of the securing strap 160 and optionally manipulates the slide buck 136 to adjust the effective length of the tread engaging strap 132 to cause the tread engaging strap 132 to become less slack on the tread surface 122. The ratchet buckle 138 is then manipulated to wind the to draw the left and right sidewall engaging straps 142 and 144 onto the reel 139. As the left and right sidewall engaging straps 142 and 144 are wound onto the reel 139, the first ring 170 is drawn toward the reel 139, which causes the tread engaging strap 132 and the second ring 172 to be pulled toward the reel 139 until the tread engaging strap 132 is in tension about the tread surface 122. Similarly, as the left and right sidewall engaging straps 142 and 144 are wound onto the reel 139, the effective length of the left and right sidewall engaging straps 142 and 144 from the second ring 172 to the reel 139 is reduced which causes the left and right sidewall engaging straps 142 and 144 to engage and constrict about the sidewalls 124 and 126 of the tire 121. With the tread engaging strap 132 in tension over the tread surface 122 and the left and right sidewall engaging straps 142 and 144 constricted about the left and right sidewalls 124 and 126, the wheel 120 movement of the wheel 120 on the platform 112 is substantially restricted.

The same procedure is used to secure the tires 120 of the vehicle 110 to the platform 112 of the transportation vehicle or accessory 114. The vehicle 110 is then transported to a selected location a selected location.

To unload the vehicle 110, a pawl on the ratchet buckle 138 is released which allows the spool 139 to unwind the left and right sidewall engaging straps 142 and 144 which in turn releases the force on the left and right side walls 124 and 126 of the tire 21. With the tension released on the left and right sidewall engaging straps 142 and 144, the tension is then released from the tread engaging strap 132. With the left and right sidewall engaging straps 142 and 144 and the tread engaging strap 132 slack, the snap hook 137 attached to the ratchet buckle 138 is removed from the back loop 116 and the snap hook 140 of the securing strap 160 is removed from the front loop 116 such that the tic down 130 can be removed from the tire 121.

Figure 9:
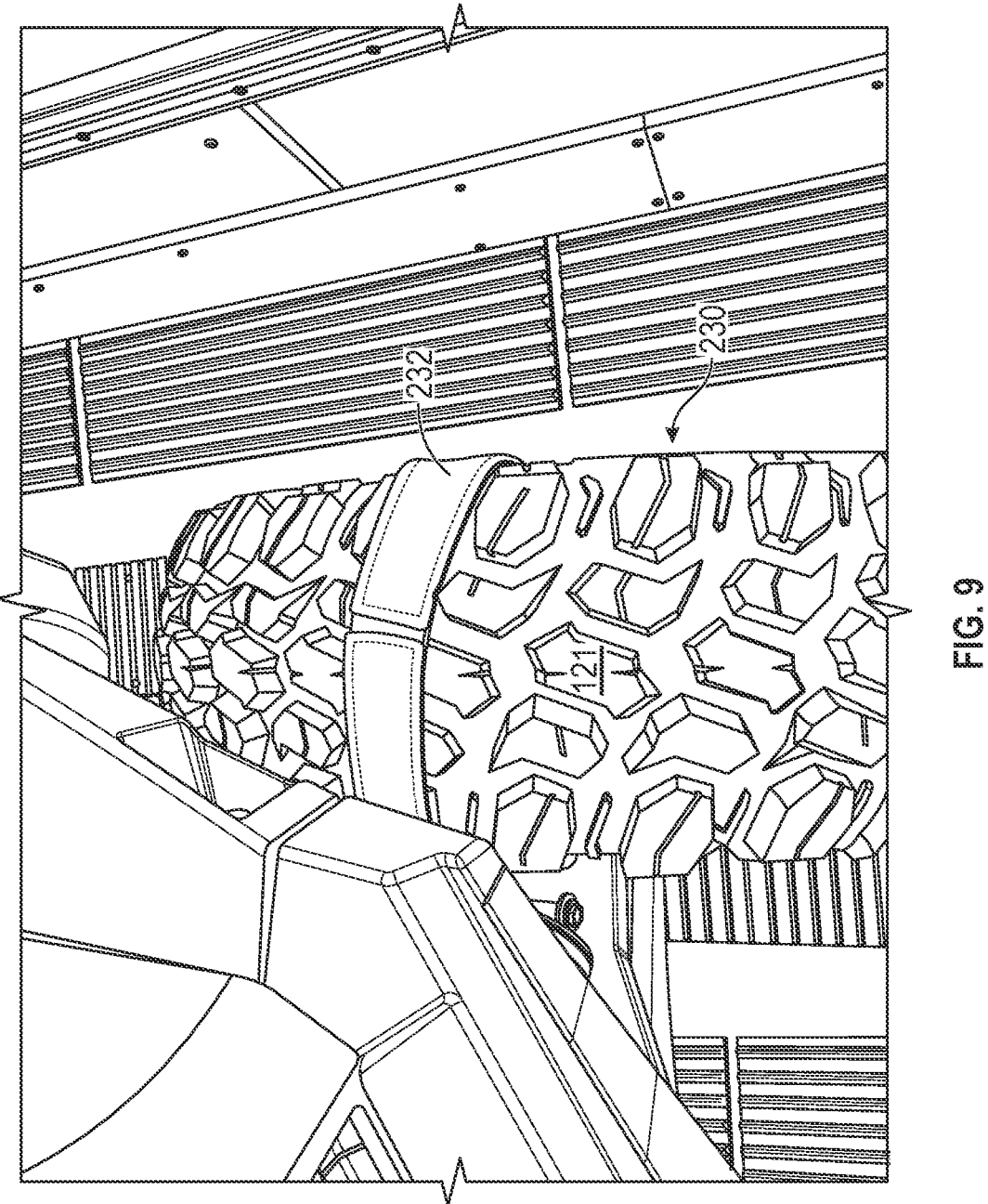
FIG. 9 is a view of the second embodiment of the self-adjusting tie down with a transverse tread engaging strap.

Referring to FIG. 9, another embodiment of a self-adjusting tie down is illustrated at 230. The self-adjusting tie down 230 includes similar left and right sidewall engaging straps 142 and 144, the ratchet buckle 138 with the snap hook 137 configured to engage the back loop 116 and the securing strap 160 with the snap hook 141 configured to engage the front loop 116. However, the tread engaging strap 132 that aligns with the circumference of the tread surface 122 is replaced with a transverse tread strap 232 that includes loops at the ends that are positioned about the left and right sidewall engaging straps 142 and 144 such that the transverse tread strap 232 is slidably positionable on the left and right sidewall engaging straps 142 and 144.

The self-adjusting tie down 230 is positioned about the tire 121 where the transverse tread strap 232 is positioned over the tire proximate an apex and the sidewall engaging straps 142 and 144 are positioned proximate the side walls of the tire. With the snap hooks 137 and 140 secured to the back and front loops 118 and 116, respectively, an effective length of the securing strap 160 can optionally be adjusted by manipulating the slide buckle 164. The ratchet buckle 138 is the manipulated to coil the sidewall engaging straps 142 and 144 onto the reel 139 to reduce the effective length of each sidewall engaging strap 142 and 144 which draws the left and right sidewall engaging straps 142 and 144 downward on the tire. As the sidewall engaging straps 142 and 144 are drawn downward on the tire, the transverse tread strap 232 applies a downward pressure on the tire which causes the tire to be retained on the platform. The tic down 230 is removed from the tire in a similar fashion as described with respect to the tie down 130.

Figure 10:
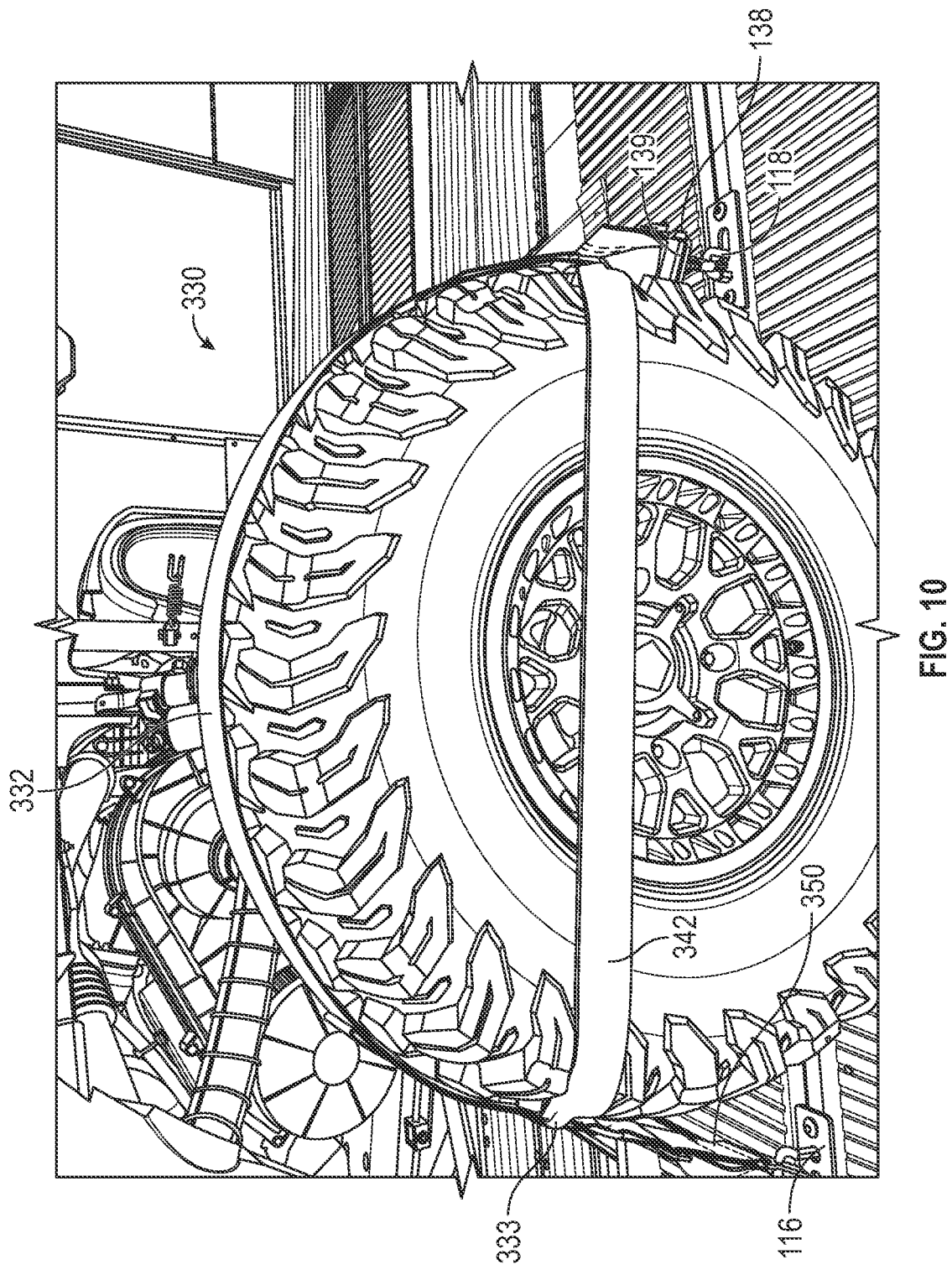
FIG. 10 is a side view of a third embodiment of the self-adjusting tie down.
Figure 11:
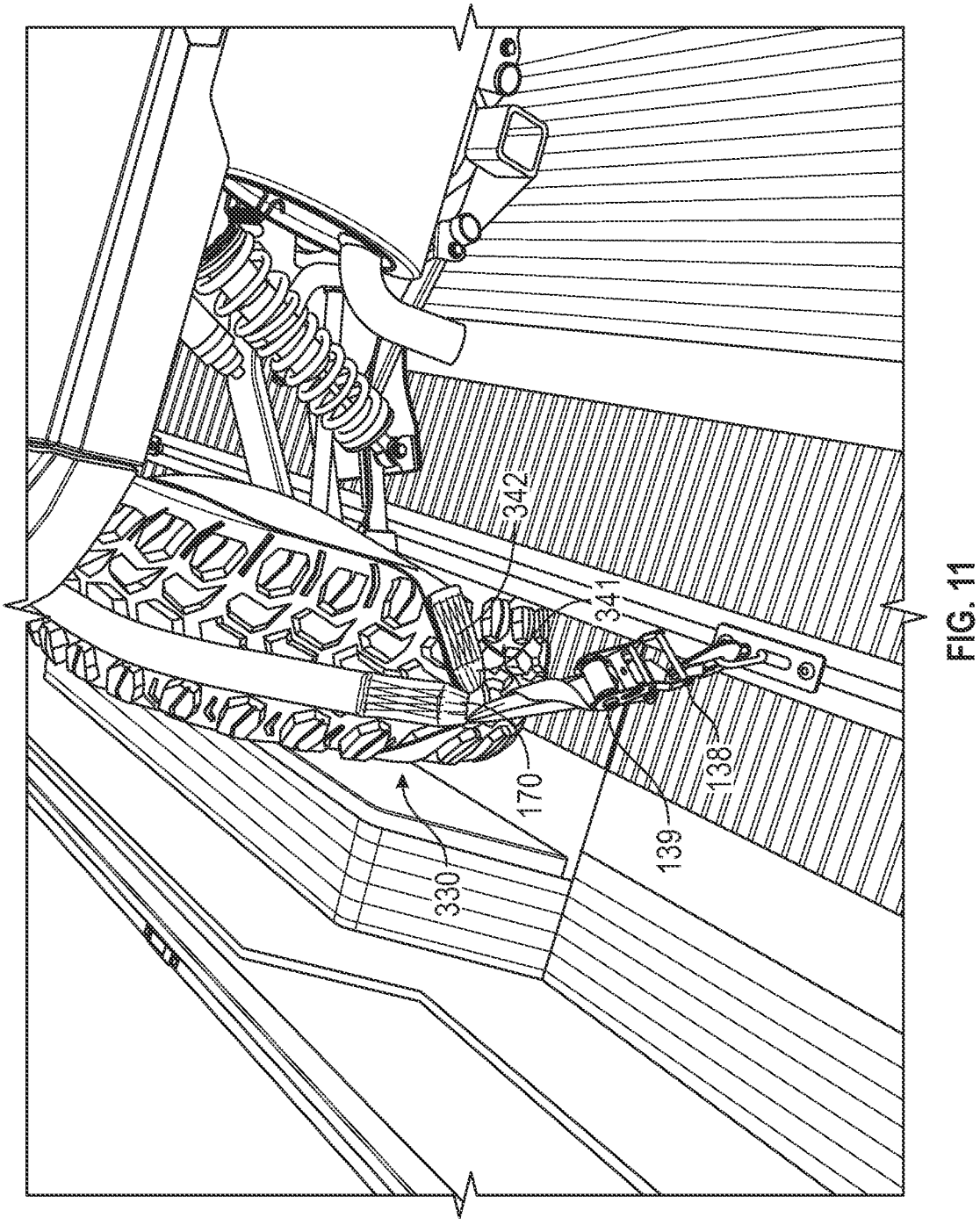
FIG. 11 is a partial view of the third embodiment of the self-adjusting tie down.
Figure 12:
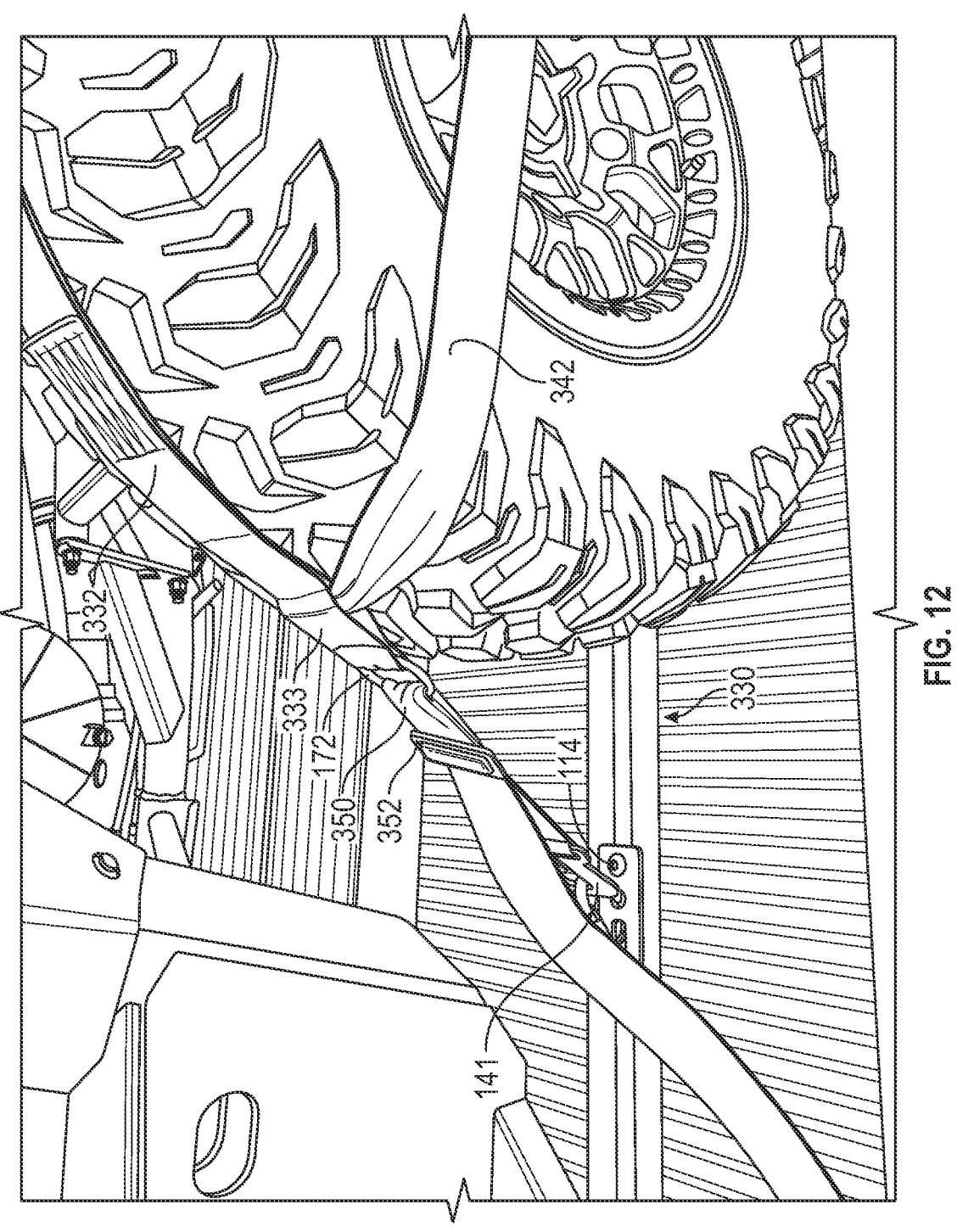
FIG. 12 is another partial view of the third embodiment of the self-adjusting tie down.

Another self-adjusting tic down is illustrated in FIGS. 10-12 at 330. The tic down 330 differs from the tie down 130 in that a single sidewall engaging strap 342 is utilized instead of two separate sidewall engaging straps 142 and 144. An end 341 of the sidewall engaging strap 342 is attached to the first ring 170 and through a loop 333 the tread engaging strap 332 proximate the second ring 172. The side wall engaging strap 342 is the positioned through the first ring 170 and into the reel 139 of the ratchet buckle 138. A securing strap 350 is attached to the second ring 172 and is secured to the front loop 116 with a snap hook 141. A slide buckle 352 is used to adjust an effective length of the securing strap 350. When the ratchet buckle 138 is manipulated, the side wall engaging strap 342 coils about the reel 139 which reduces the effective length of the sidewall engaging strap 342. As the effective length is reduced, the side wall engaging strap 342 constricts against the sidewalls of the tire while pulling the first ring 170 towards the reel 139, which causes the tread engaging strap 332 to apply downward pressure on the tread surface of the tire. With the tread engaging strap 332 applying downward pressure and the side wall engaging strap 342 applying pressure to both sidewalls of the tire, the tire remains substantially stationary on the platform of the transport vehicle or accessory. The tie down 330 is removed in the same manner as the tie downs 130 and 230.

Figure 13:
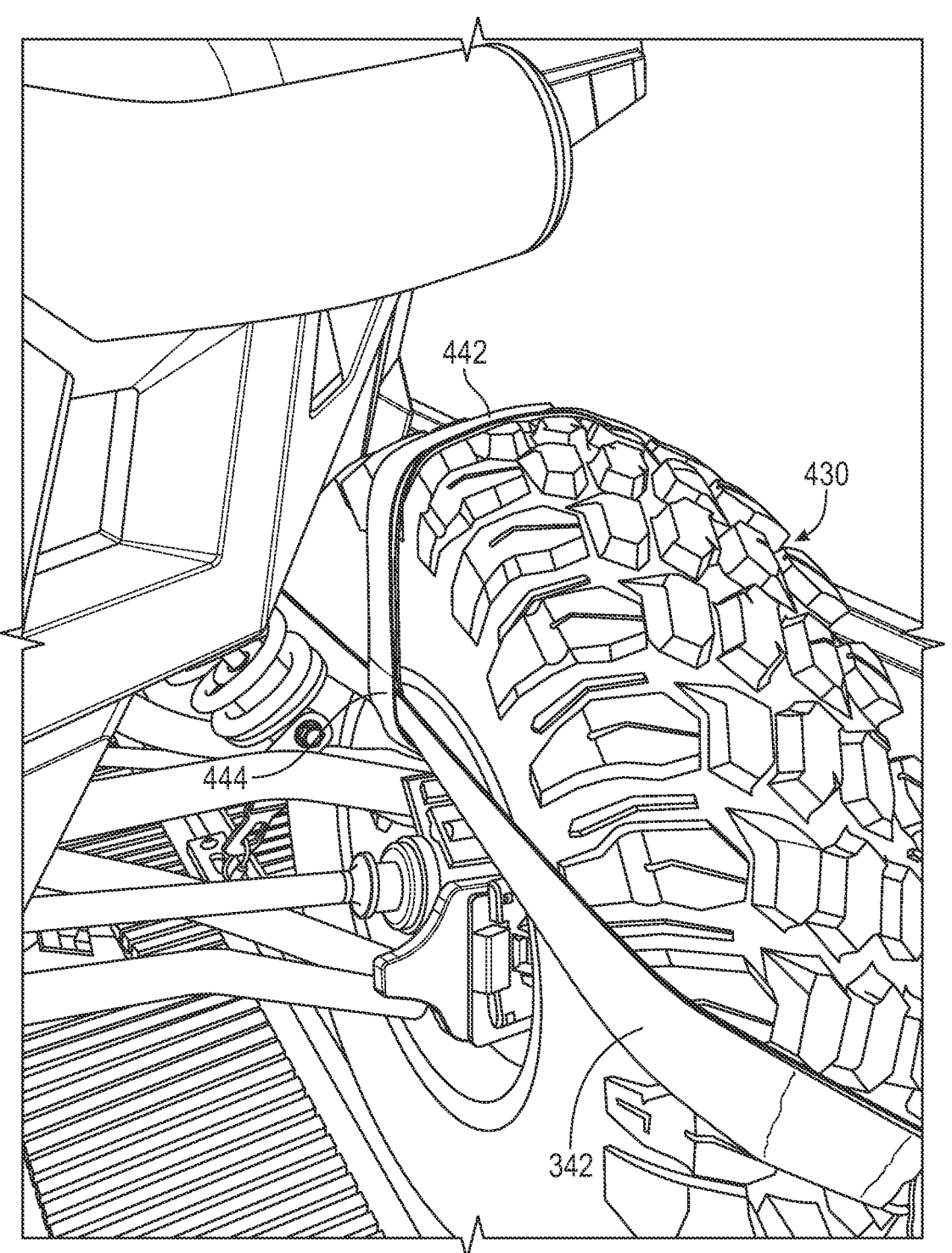
FIG. 13 is a view of the third embodiment of the self-adjusting tie down with a transverse tread engaging strap.

Another self-adjusting tie down is illustrated in FIG. 13 at 430. The tie down 430 includes substantially the same single sidewall engaging strap 342 as disclosed with respect to the embodiment 330, but replaces the tread engaging strap 332 with a transverse tread engaging strap 442 having a similar configuration as disclosed in the embodiment 230 where the transverse tread engaging strap 442 has loops 444 at the ends that slidably attach to the singe sidewall engaging strap 342. The transverse tread engaging strap 442 is positioned proximate the apex of the tire and the effective length of the sidewall engaging strap 442 is reduced by winding the strap on the reel 339 on the ratchet buckle 338 to cause the sidewall engaging strap 442 to constrict against the sidewalls of the tire and the transverse tread engaging strap 442 applies a downward pressure to retain the wheel to the platform. The tic down 430 is removed as previously discussed with respect to the embodiments 130, 230 and 330.

The alternatives for the rings, spring clamps and tightening mechanism disclosed with respect to the embodiment 10 similarly applies to the embodiments 130, 230, 330 and 430. Similarly, the different colors for straps engaging the tread and sidewalls as disclosed and described with respect to the embodiment 10 also applies to the embodiments 130, 230, 330 and 430.

Although the present invention has been described with reference to preferred embodiments, workers skilled in the art will recognize that changes may be made in form and detail without departing from the spirit and scope of the invention.

The invention claimed is:

1. A self-adjusting tie down for securing a tire on a wheel of a vehicle to a platform having first and second loops attached thereto, the tire having a tread surface and left and right sidewalls, the tie down comprising:
   a first ring;
   a second ring spaced from the first ring;
   a tread engaging strap configured to engage the tread surface of the tire, the tread strap being attached to the first ring proximate a first end and positioned through the second ring, the tread engaging strap comprising:
      a length adjusting mechanism attached to a second end; and
      a first securing mechanism configured to engage the first loop attached to the platform;
   first and second sidewall engaging straps configured to engage the left and right sidewalls of the tire, each of the first and second sidewall engaging straps attached to the second ring proximate a first and positioned through the first ring, each of the first and second sidewall engaging straps comprising a second securing mechanism configured to engage the second loop attached to the platform;
   wherein when a wheel of a vehicle is positioned on the platform between the first and second loops, the tread engaging strap is positioned on the tread surface of the tire and the first and second sidewall engaging straps are positioned proximate the first and second sidewalls, the first securing mechanism engaging the first loop and the second securing mechanisms attached to the second loop, the length adjusting mechanism is manipulated to shorten an effective length of the tread engaging strap which raises the first ring and causes a length of a path from the second loop to the first ring to increase and causes the first and second sidewall straps to engage the left and right sidewalls as the tread engaging strap engages the tread surface of the tire.

2. The self-adjusting tie down of claim 1, wherein the first ring and the second ring each comprises a D ring.

3. The self-adjusting tie down of claim 1, wherein the first securing mechanism comprises a spring-loaded snap hook.

4. The self-adjusting tie down of claim 1, wherein each of the second securing mechanisms comprises a spring-loaded snap hook.

5. The self-adjusting tie down of claim 1, wherein each of the first and second sidewall engaging straps includes a buckle configured to attach each of the first and second sidewall engaging straps to the second ring.

6. The self-adjusting tie down of claim 1, wherein each of the first and second sidewall engaging straps includes a stitching that attaches each of the first and second sidewall engaging straps to the second ring.

7. The self-adjusting tie down of claim 1, wherein the tread strap includes a buckle configured to attach the tread strap to the first ring.

8. The self-adjusting tie down of claim 1, wherein the tread strap is secured to the first ring with stitching.

9. The self-adjusting tie down of claim 1, wherein the length adjust mechanism comprises a ratchet buckle.

10. The self-adjusting tie down of claim 1, wherein the tread engaging strap is a first primary color and the first and second sidewall straps are a second primary color different from the first primary color.

11. A method of securing a tire to a platform having first and second loops attached thereto, the method comprising:
   providing a self-adjusting tie down comprising:
      a first ring;
      a second ring spaced from the first ring;
      a tread engaging strap configured to engage a tread surface of the tire, the tread strap being attached to the first ring proximate a first end and positioned through the second ring, the first strap comprising:
         a length adjusting mechanism attached to a second end; and
         a first securing mechanism;
      first and second sidewall engaging straps configured to engage the left and right sidewalls of the tire, each of the first and second sidewall engaging straps attached to the second ring proximate a first end and positioned through the first ring, each of the first and second sidewall engaging straps comprising a second securing mechanism;
   positioning the tie down about the tire such that the tread engaging strap engages a tread surface of the tire and the first and second sidewall engaging straps are proximate left and right sidewalls of the tire;
   securing the first securing mechanism of the tread engaging strap to the first loop attached to the platform;
   securing each of the second securing mechanisms of the first and second sidewall engaging straps to the second loop attached to the platform; and
   manipulating the length adjusting mechanism such that an effective length of the tread engaging strap is shortened which raises the first ring and causes a length of a path from the second loop to the first ring to increase and causes the first and second sidewall straps to engage the left and right sidewalls as the tread engaging strap engages the tread surface of the tire.

12. The method of claim 11, wherein the first ring and the second ring each comprises a D ring.

13. The method of claim 11, wherein the first securing mechanism comprises a spring-loaded snap hook.

14. The method of claim 11, wherein each of the second securing mechanisms comprises a spring-loaded snap hook.

15. The method of claim 11, wherein each of the first and second sidewall engaging straps includes a buckle configured to attach each of the first and second sidewall engaging straps to the second ring.

16. The method of claim 11, wherein each of the first and second sidewall engaging straps includes a stitching that attaches each of the first and second sidewall engaging straps to the second ring.

17. The method of claim 11, wherein the tread strap includes a buckle configured to attach the tread strap to the first ring.

18. The method of claim 11, wherein the tread strap is secured to the first ring with stitching.

19. The method of claim 11, wherein the length adjusting mechanism comprises a ratchet buckle.

20. A self-adjusting tie down for securing a tire on a wheel of a vehicle to a platform having first and second loops attached thereto, the tire having a tread surface and left and right sidewalls, the tie down comprising:
   a first ring;
   a second ring spaced from the first ring;
   a securing strap attached to the first ring and having a first securing mechanism configured to engage the second loop;

a tread engaging strap configured to engage the tread surface of the tire, the tread engaging strap engaging the first and second rings;

first and second sidewall engaging straps configured to engage the left and right sidewalls of the tire, each of the first and second sidewall engaging straps attached to the first ring or the second ring; and a length adjusting mechanism configured to be attached to the second loop with a second securing mechanism, the length adjusting mechanism configured to coil and uncoil the sidewall engaging strap;

wherein when a wheel of a vehicle is positioned on the platform between the first and second loops, the tread engaging strap is positioned on the tread surface of the tire and the first and second sidewall engaging straps are positioned proximate the first and second sidewalls, the first securing mechanism engaging the first loop and the second securing mechanisms attached to the second loop, the length adjusting mechanism is manipulated to shorten an effective length of the first and second sidewall engaging straps which draws the second ring toward the length adjusting mechanism and raises the first ring and causes the first and second sidewall straps to engage the left and right sidewalls as the tread engaging strap engages the tread surface of the tire.

21. The self-adjusting tie down of claim 20, wherein the left and right sidewall straps are each attached to the first ring and pass through the second ring to the length adjusting mechanism.

22. The self-adjusting tie down of claim 20 wherein the left and right sidewall straps comprise a single strap that has one end attached to the second loop, passes through a loop in the tread engaging strap and returns to the length adjusting mechanism through the second loop.

23. The self-adjusting tie down of claim 20, wherein the tread engaging strap is a first primary color and the first and second sidewall straps are a second primary color different from the first primary color.

24. A self-adjusting tie down for securing a tire on a wheel of a vehicle to a platform having first and second loops attached thereto, the tire having a tread surface and left and right sidewalls, the tie down comprising:

a first ring;

a second ring spaced from the first ring;

a securing strap attached to the first ring and having a first securing mechanism configured to engage the second loop;

first and second sidewall engaging straps configured to engage the left and right sidewalls of the tire, each of the first and second sidewall engaging straps attached to the first ring or the second ring;

a transverse tread engaging strap configured to engage the tread surface of the tire, the transverse tread engaging strap slidably engaging the first and second sidewall engaging straps; and a length adjusting mechanism configured to be attached to the second loop with a second securing mechanism, the length adjusting mechanism configured to coil and uncoil the sidewall engaging strap;

wherein when a wheel of a vehicle is positioned on the platform between the first and second loops, the tread engaging strap is positioned on the tread surface of the tire and the first and second sidewall engaging straps are positioned proximate the first and second sidewalls, the first securing mechanism engaging the first loop and the second securing mechanisms attached to the second loop, the length adjusting mechanism is manipulated to shorten an effective length of the first and second sidewall engaging straps which draws the second ring toward the length adjusting mechanism and raises the first ring and causes the first and second sidewall straps to engage the left and right sidewalls as the transverse tread engaging strap engages the tread surface of the tire.

25. The self-adjusting tie down of claim 24, wherein the left and right sidewall straps are each attached to the first ring and pass through the second ring to the length adjusting mechanism.

26. The self-adjusting tie down of claim 24 wherein the left and right sidewall straps comprise a single strap that has one end attached to the second loop, passes through a loop in the tread engaging strap and returns to the length adjusting mechanism through the second loop.

27. The self-adjusting tie down of claim 24, wherein the tread engaging strap is a first primary color and the first and second sidewall straps are a second primary color different from the first primary color.

\* \* \* \* \*